(12) United States Patent
Fromentoux et al.

(10) Patent No.: US 11,924,300 B2
(45) Date of Patent: Mar. 5, 2024

(54) METHODS FOR CONTROLLING A MULTI-ACCESS EDGE COMPUTING NETWORK

(71) Applicant: Orange, Issy-les-Moulineaux (FR)

(72) Inventors: Gaël Fromentoux, Chatillon (FR); Frédéric Fieau, Chatillon (FR); Emile Stephan, Chatillon (FR)

(73) Assignee: Orange

( * ) Notice: Subject to any disclaimer, the term of this patent is extended or adjusted under 35 U.S.C. 154(b) by 0 days.

(21) Appl. No.: 17/776,471

(22) PCT Filed: Nov. 3, 2020

(86) PCT No.: PCT/FR2020/051979
§ 371 (c)(1),
(2) Date: May 12, 2022

(87) PCT Pub. No.: WO2021/094668
PCT Pub. Date: May 20, 2021

(65) Prior Publication Data
US 2022/0407938 A1    Dec. 22, 2022

(30) Foreign Application Priority Data

Nov. 12, 2019  (FR) ...................................... 1912611

(51) Int. Cl.
*G06F 15/16* (2006.01)
*H04L 41/0893* (2022.01)
*H04L 67/563* (2022.01)

(52) U.S. Cl.
CPC ........ *H04L 67/563* (2022.05); *H04L 41/0893* (2013.01)

(58) Field of Classification Search
CPC .......................... H04L 67/563; H04L 41/0893
USPC ........................................................ 709/223
See application file for complete search history.

(56) References Cited

U.S. PATENT DOCUMENTS

| 10,411,964 | B2 * | 9/2019 | Zhang | H04L 41/50 |
| 10,536,515 | B2 * | 1/2020 | Majumdar | H04L 67/51 |
| 10,848,974 | B2 * | 11/2020 | Bachmutsky | H04W 76/10 |
| 10,880,176 | B2 * | 12/2020 | Zhang | H04L 41/40 |
| 11,050,813 | B2 * | 6/2021 | Sabella | H04L 67/10 |

(Continued)

FOREIGN PATENT DOCUMENTS

| WO | WO 2018/128898 A1 | 7/2018 | |
| WO | WO-2021094668 A1 * | 5/2021 | ............. G06F 9/547 |
| WO | WO-2021191535 A1 * | 9/2021 | ............. H04W 12/08 |

OTHER PUBLICATIONS

International Search Report for PCT Application No. PCT/FR2020/051979 dated Feb. 5, 2021.

*Primary Examiner* — Alicia Baturay
(74) *Attorney, Agent, or Firm* — Knobbe, Martens, Olson & Bear, LLP

(57) ABSTRACT

Controlling operations in a network having multiple multi-access edge computing architectures is disclosed. A method for controlling a service application in a multi-access edge computing network, the network including a plurality of interconnected entities, includes controlling, by a platform module comprised in a first entity of the plurality, an execution of a service application installed in a second entity of the plurality, by means of a proxy function comprised in the second entity, the second entity being distinct from the first entity.

13 Claims, 5 Drawing Sheets

(56) References Cited

U.S. PATENT DOCUMENTS

| | | | |
|---|---|---|---|
| 11,469,954 B2* | 10/2022 | Parvataneni | H04L 41/0895 |
| 2014/0372528 A1* | 12/2014 | Nishiguchi | G06F 9/547 |
| | | | 709/204 |
| 2021/0014303 A1* | 1/2021 | Guim Bernat | H04L 41/5051 |
| 2022/0116445 A1* | 4/2022 | Filippou | H04L 41/0853 |
| 2023/0026264 A1* | 1/2023 | Paczkowski | H04W 84/02 |

\* cited by examiner

METHODS FOR CONTROLLING A MULTI-ACCESS EDGE COMPUTING NETWORK

CROSS-REFERENCE TO RELATED APPLICATIONS

This application is filed under 35 U.S.C. § 371 as the U.S. National Phase of Application No. PCT/FR2020/051979 entitled "METHODS FOR CONTROLLING A MULTI-ACCESS EDGE COMPUTING NETWORK" and filed Nov. 3, 2020, and which claims priority to FR 1912611 filed Nov. 12, 2019, each of which is incorporated by reference in its entirety.

BACKGROUND

Field

This description relates to the field of multi-access edge computing networks and, more specifically, to methods for controlling operations in such networks.

Description of the Related Technology

The fields of health, transportation, energy, and the freight transport industry will soon become major areas of use of the 5G standards in telecommunications. In particular, the 5G standards will considerably improve the speeds, connectivity, latency, and reliability of communications in the field of industrial production known as "4.0", for example in the context of controlling connected devices, controlling robots, coordinating multiple machine tools, or transmitting and sharing data or services between different operators. The 5G standards will also make it possible to perfect numerous technologies within the field of the Internet of Things, and within the field of augmented reality or even virtual reality.

In this context, one commonly encountered difficulty is the ability to have network architectures that satisfy the constraints required by stakeholders in a given industrial sector when they exchange information or applications, for example service applications. Such constraints are necessary to guarantee high speeds and low latencies during the communication of data between multiple industrial sites, in order to meet specific traffic needs or share the use of common systems between different ordering parties.

To do this, multi-access edge computing networks are known, referred to as MEC networks. The ETSI (European Telecommunications Standards Institute) group has defined precise technical specifications relating to network architectures compatible with the standards of multi-access edge computing.

According to these standards, a MEC network provides a multi-access edge computing system that hosts service applications at a level positioned closest to the "end user" level. This makes it possible to store and process data with a faster response time than traditional infrastructures and networks.

In addition, a MEC network is designed to be compatible with different types of mobile or fixed access, which allows it to be installed physically and directly at any level in a network provided by an operator, and for example in base stations or in infrastructure belonging to specific users or industries. The data collected or used can then be communicated via a higher level network that is possibly virtual, for example a cloud network.

The use of MEC networks makes it possible to meet the above requirements; for example, MEC networks allow improving data sharing at an industrial site by means of wireless communications. The corresponding architecture defines a space for exchanging and controlling data that complies with the above conditions.

However, known methods for MEC network communication and control have several major disadvantages.

First of all, the technical specifications of MEC networks and architectures which will be deployed in the near future are currently only intended for controlling operations within a single domain, for example at a single given industrial site. It is therefore not possible to control an operation of one domain from another domain.

In addition, the specifications of MEC networks and architectures do not allow deploying applications from one domain to another domain. For example, an operator of a network associated with a MEC architecture of a first domain does not have the ability to interact with an operator associated with an architecture of a second domain, in particular in order to execute applications of the first domain in this second domain or to implement the control of an operation in other connected domains.

In addition, it is not possible to share or exchange resources required for the execution of applications by multi-access edge computing systems located in different domains. Currently, MEC architectures therefore do not allow controlling operations in "inter-domain" mode.

Furthermore, current MEC architectures and networks also do not allow different entities to perform a task in a given domain if that task requires a resource that is absent from the multi-access edge computing system deployed in that domain.

SUMMARY

In order to improve the situation and to overcome this or these disadvantages, there is proposed, in general, a method for controlling a service application in a multi-access edge computing network, the network comprising a plurality of interconnected entities, the method comprising: controlling, by a platform module comprised in a first entity of said plurality, an execution of a service application installed in a second entity of the plurality, by means of a proxy function comprised in said second entity, the second entity being distinct from the first entity.

This allows the implementation of inter-domain application exchanges. This also allows the transmission of applications and/or the use of services within one or more entities within a multi-access edge computing network.

Herein, and in general, module designates a hardware or software computer component integrated into the network.

Herein, and in general, the terms "Multi-access Edge Computing" and "MEC" are used interchangeably. In addition, the terms "entity" and "architecture" are used interchangeably. Thus, an entity of a multi-access edge computing network is a MEC architecture.

Herein, and in accordance with these terms, it is thus defined that an edge computing network comprises a plurality of entities, i.e. at least two MEC architectures.

Herein, a service executed by an application is an application service, and preferably a network service such as a DNS service or an application proxy deployed in an entity comprised in the network. Examples of application services comprise, without limitation, services for controlling industrial robots, services for managing environmental conditions, services for communication between connected terminals, services for collecting physical measurements, services for sharing information between industrial sites, etc.

In one embodiment, the method further comprises: locating a module among a plurality of modules comprised in the second entity; and installing the proxy function in the located module.

Herein, and in general, proxy function designates a software implementation able to allow an interaction between a host entity and a guest entity. For example, a proxy function installed in a module makes it possible to implement a command or an action from an element of a "host" network which houses it on behalf of a "guest" element which is external to it, and thus allow access to services provided by the host element.

Herein, proxy function may also refer to a network service such as a DNS service or any other type of proxy service that can be deployed to one of the entities.

Herein, the network comprises a plurality of entities, i.e. a plurality of multi-access edge computing architectures, known as MEC architectures. Locating the module within an entity makes it possible to trigger the control of the execution of the service by an application installed in another entity.

This also allows the located module, referred to herein as a "proxy module", to act as an intermediary between several entities of a multi-access edge computing network or between entities of different networks.

In one particular embodiment, the locating of the module is preceded by the locating of a current entity among the plurality of interconnected entities, the module to be located being comprised in said current entity.

In one embodiment, the method further comprises: analyzing a network topology in order to identify the presence of a current module in a multi-access edge platform of the network, with a view to locating the module; selecting said current module as the located module, with a view to installing the proxy function.

Identifying the presence of at least one such module allows it to serve as a proxy module, i.e. to define an instance located within a hardware element of a MEC architecture. This instance can be configured to act as an intermediary with another MEC architecture. Such a "proxy" module may be a physical server or even a virtual server instantiated in a physical server.

Herein, the locating of a module among the modules connected by the network is done according to the topology of the network.

According to various examples, this locating is done according to the presence of this module in at least one element of an entity of the edge network of the network, which include: an edge platform, an edge platform manager, a virtual network virtualization infrastructure of the network, or even a data plane of the network. These elements will be described below in relation to the figures.

In particular, this allows an entity to remotely execute this application service in another entity, and more generally to control it.

This also allows an operator or ordering party of one MEC architecture to run application services within another MEC architecture of which it is not an operator or ordering party, and vice versa.

In one embodiment, the installed proxy function is configured to delegate control over the execution of the service application to the second entity.

This makes it possible to create an interface between hardware or software components belonging to separate entities.

This also allows an operator or ordering party of an entity of a given edge computing network to remotely control service applications through another entity.

In addition, this allows using and combining resources of the domains to which each of these entities belongs, for the execution of application services.

In one embodiment, the locating of the module is implemented upon receipt, by the first entity, of a location response to a corresponding location request.

This allows testing for the presence and/or position of the located module in the edge computing network.

In one particular embodiment, the location request and a response thereto are exchanged between edge platform managers of the first and second entities.

In one embodiment, the installation of the proxy function is implemented upon receipt, by the located module, of a request to upload said proxy function.

This makes it possible to install a proxy function that is not initially present in the located module.

In one particular embodiment, the upload request and a response thereto are exchanged between the located module and an edge platform manager of the first entity.

In one embodiment, the proxy function is installed via a multi-access edge application of the second entity upon receipt by said application of an installation request.

This allows supplying the located module with a proxy function that is not initially present within it.

In one particular embodiment, the installation request and a response thereto are exchanged between the located module and at least one edge application.

In one embodiment, the control of the execution of the service application is implemented upon receipt, by the second entity, of a control request.

In one embodiment, the delegation of the control of the execution of the service application is implemented upon receipt, by the first entity, of a representation request from the second entity.

Preferably, the representation request is received by the located module.

In one embodiment, the control of the execution of the service application further comprises a sending, by the located module and to the first entity, of a control response to the control request.

In one embodiment, at least one request or a response to at least one request is sent via an intermediate reference point connecting the first entity and the second entity.

A computer program is also proposed, comprising instructions for implementing the method according to one of the preceding embodiments, when said instructions are executed by a processor of a computer processing circuit.

Also proposed is an information storage medium, removable or not, partially or entirely readable by a computer or a processor, comprising code instructions of a computer program for the execution of each of the steps of the method according to any of the preceding embodiments.

BRIEF DESCRIPTION OF THE DRAWINGS

Other features, details, and advantages will become apparent upon reading the detailed description below, and upon analyzing the appended drawings, in which.

Unless otherwise indicated, elements that are the same or similar in multiple figures bear the same reference symbols and have identical or similar characteristics, so for simplicity these elements are generally not described again.

DETAILED DESCRIPTION OF CERTAIN ILLUSTRATIVE EMBODIMENTS

For the most part, the drawings and the description below contain elements that are certain in nature. Therefore they may serve to provide a better understanding of this disclosure and to contribute to its definition, where applicable.

Figure 1:
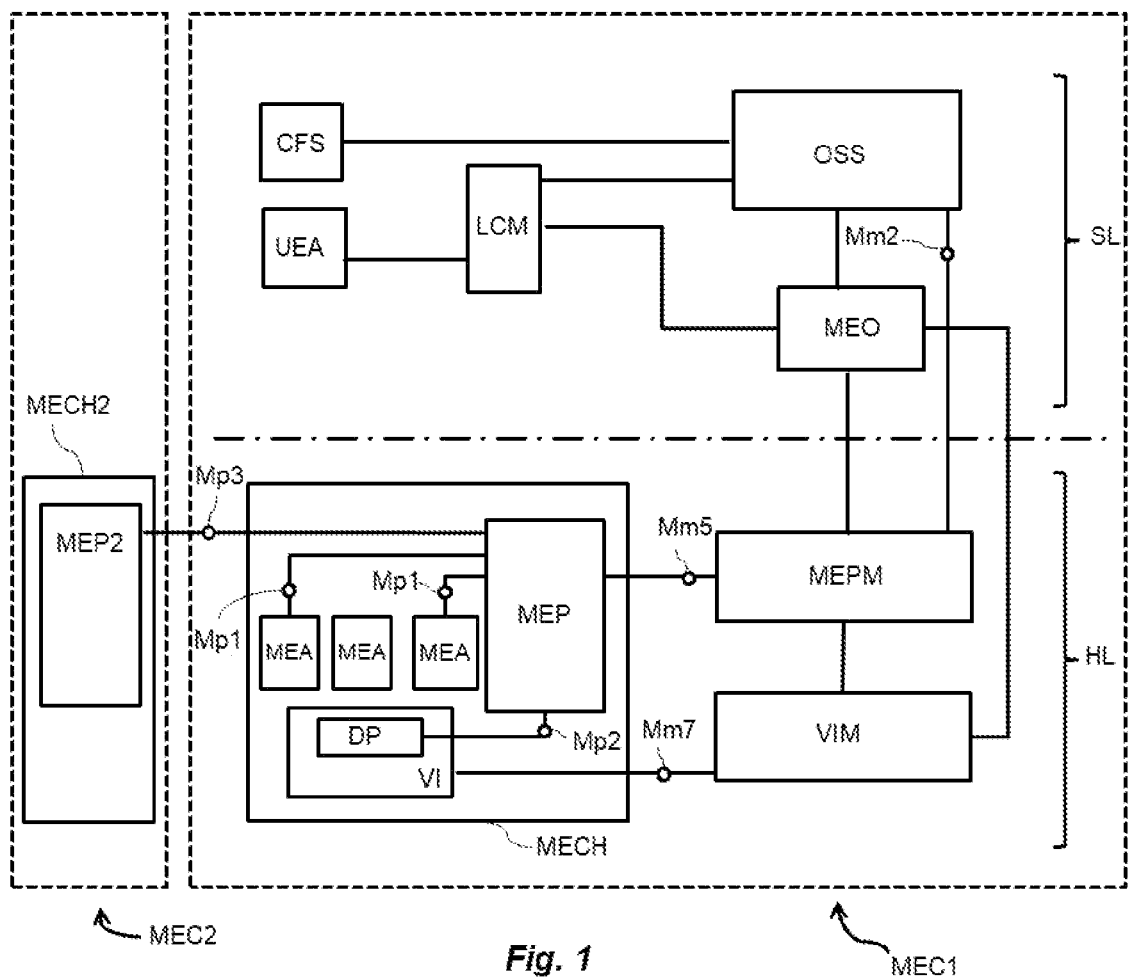
FIG. 1 represents a schematic view of an entity comprised in an edge computing network according to one embodiment.

Reference is now made to FIG. 1, which depicts an example of an entity, i.e., a MEC architecture, comprised in a multi-access edge computing network according to one embodiment. This network comprises in particular two entities MEC1 and MEC2.

Various functional elements comprised in entity MEC1 are illustrated in more detail. These functional elements are grouped into several levels, or layers, which include a system level SL corresponding to an upper layer and a host level HL corresponding to an intermediate layer.

Concerning the intermediate layer, the host level HL comprises at least one host module of the edge network, referred to as host module MECH (or "Mobile Edge Computing Host"). This host module MECH makes it possible, in particular, to provide a means of storing and processing information.

A host module MECH comprises at least one edge platform, referred to as platform module MEP (or "Mobile Edge Platform"), a virtual network virtualization infrastructure, referred to as infrastructure VI (or "Virtual Network Function Infrastructure"), as well as at least one edge application, referred to as application MEA (or "Mobile Edge Application").

Typically, an application MEA is run as a virtual machine on infrastructure VI. When executed, application MEA interacts with platform module MEP via at least one reference point Mp1, which may also be used for implementing additional support procedures.

In addition, point Mp1 provides an interface connecting one or more applications MEA to a platform module MEP, which makes it possible to monitor the status of such applications. This monitoring is implemented internally relative to a server which hosts this or these applications.

An example of an application MEA is an application configured to indicate the resource or service requirements of host module MECH, or to specify or update constraints relating to host module MECH.

Infrastructure VI provides computing, storage, and network resources for one or more applications MEA. Infrastructure VI also comprises a switching plane called the data layer, also called the data plane DP, configured to execute the transmission rules received by platform module MEP.

Data plane DP is generally included in infrastructure VI of host module MECH and allows, in particular, routing data between the various services, applications, and services associated with the architecture.

Platform module MEP comprised in module MECH provides a set of basic functionalities for executing applications on a host entity and for allowing these applications to use the associated services.

These functionalities are used, for example, to organize the routing of data between different applications, or between services and/or networks interacting with a MEC architecture.

The host level HL further comprises other entities external to host module MECH, such as a host level multi-access edge platform manager, referred to as manager MEPM (or "Mobile Edge Platform Manager"), or even a virtualization infrastructure manager, referred to as manager VIM.

Manager VIM is linked to interface VI by reference point Mm7, which makes it possible to manage the virtualized resources of host module MECH and/or to manage possible instantiations. It is also used to store information about available resources.

Manager MEPM receives traffic forwarding rules, and in particular manages the lifecycles of mobile edge applications and management functions.

Manager MEPM may be either a local or a centralized function in a MEC architecture. Manager MEPM makes it possible to provide detailed information on one or more host modules MECH deployed in different locations, for example to allow specifying the IP addresses of the servers which house them for example.

Manager MEPM is connected to platform module MEP via reference point Mm5 which allows it to send instructions. These instructions can be sent from platform module MEP to interface VI via reference point Mp2.

Reference point Mp2 provides an interface connecting platform MEP to data plane DP in order to allow it to communicate and transmit data.

Reference points Mp1 and Mp2 make it possible to exchange and manage data flows between different entities of host module MECH, for example signals passing via data plane DP.

Platform module MEP also handles the configuration of an optional local server, such as a DNS server, which can be used to direct user traffic to desired edge applications.

Host module MECH of entity MEC1, and in particular platform module MEP of host module MECH, are configured to exchange data with another architecture, here represented by entity MEC2.

Specifically, an interface can be implemented between entities MEC1 and MEC2 by means of a reference point Mp3.

As illustrated, this reference point Mp3 can connect host module MECH of entity MEC1 to a second host module MECH2 comprised in entity MEC2. In particular, this connection can be established between platform module MEP of host module MECH of first entity MEC1 and another platform module MEP2 of host module MECH2 comprised in second entity MEC2.

At least one platform module among MEP and MEP2 is a local platform, i.e. a platform integrated into the topology of the corresponding entity MEC1 or that of MEC2.

Reference point Mp3 makes it possible to exchange and manage data flows between several entities, and in particular between the MEC architectures comprised in the network RMEC.

The upper layer of entity MEC1, which corresponds to the system level SL, comprises an operations support system known as the OSS system, an LCM proxy (or "Life Cycle Manager"), and a multi-access orchestrator known as the MEO orchestrator (or "Mobile Edge Orchestrator"), which is configured to run mobile edge applications.

In general, the OSS system comprises at least an OSS system, a BSS system (or "Business Support System"), and/or an OSS/BSS system.

The MEO orchestrator is arranged to communicate with applications installed on user equipment, referred to as UEA applications (or "User Equipment Applications"), or with a CFS portal (or "Customer-Facing Service") which serves as an entry point for a third-party application.

Herein, a UEA application is a web application, i.e. an application that can be manipulated directly online using a web browser. Typically, such a UEA application does not require installation on a client machine.

A UEA application allows applications to be moved between external networks, for example cloud networks, and the edge network. In particular, a UEA application may be an edge application which is instantiated in an element of the host level HL in response to a request from a device.

Herein, the LCM Proxy is a lifecycle management proxy for user applications, and further allows applications to request the integration, instantiation, termination of user applications, or the relocation of user applications to inside and to outside the mobile edge network.

At the system level SL, an execution of a mobile edge application can be initiated by a third-party device via a reference point located between a UEA application and the LCM proxy. The execution of such an application can also be initiated via another reference point located between the CFS portal and the OSS system.

According to various examples, the various elements of the SL level make it possible to implement one or more instantiations of specific applications in the host module MECH, and in particular, instantiations carried out at the request of one or more user equipment applications UEA.

The MEO orchestrator is configured to have knowledge of the topology of the MEC architecture, of all host modules deployed in the architecture, and of the services and resources available in each host module.

As for the OSS system, it is connected to the host level NL via a reference point Mm2 connecting it to manager MEPM and designed to trigger the instantiation and the closing of mobile edge applications of the host module, for example.

Reference point Mm2 may also be used for managing the faults, the configuration, and the performance of platform module MEP.

The MEO orchestrator is connected to manager MEPM via a reference point Mm3, and is further connected to manager VIM via a reference point Mm4.

Figure 2:
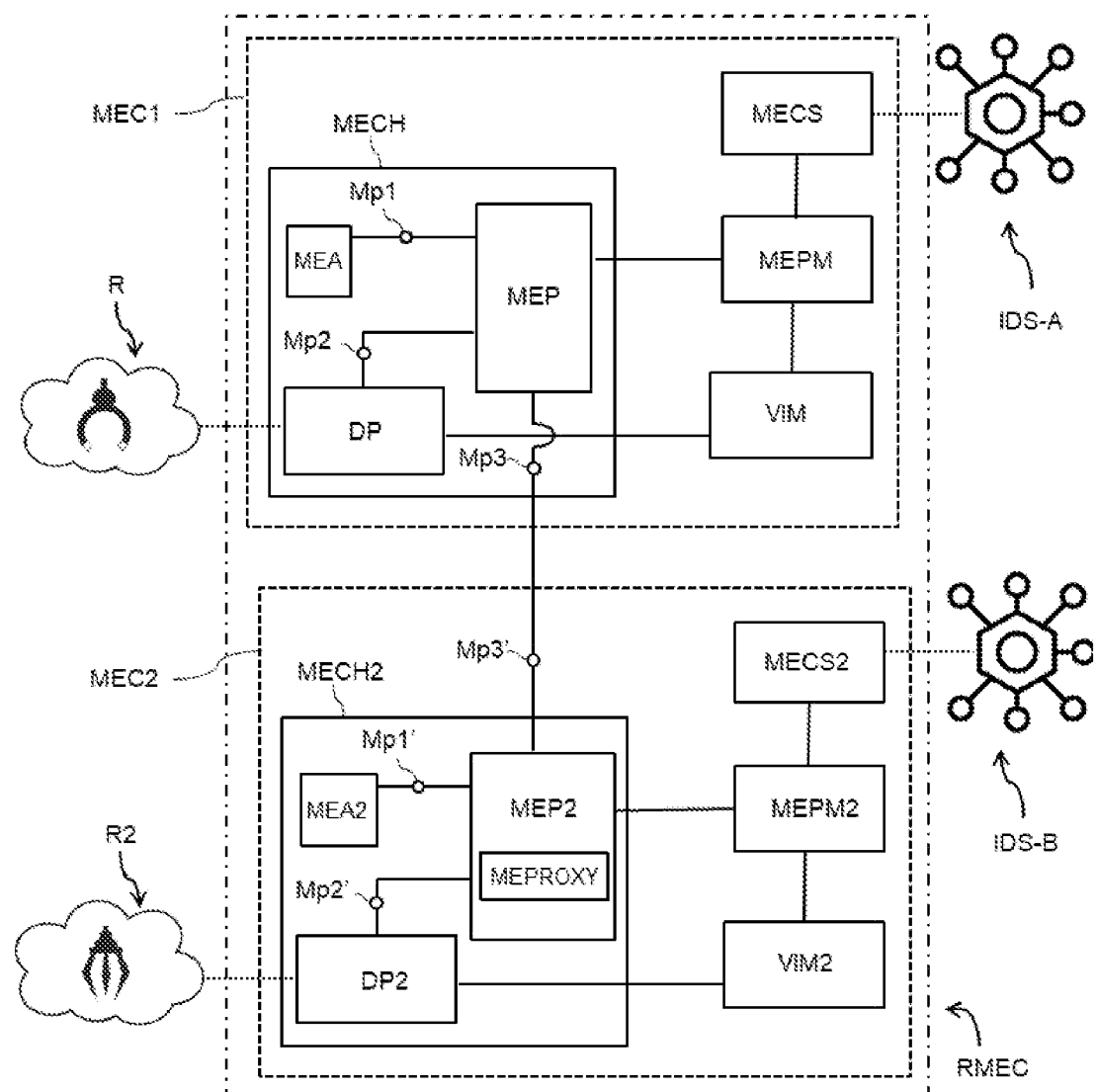
FIG. 2 represents a schematic view of a network comprising several entities according to one embodiment.

Reference is now made to FIG. 2, which represents a schematic view of a network comprising multiple MEC entities or architectures according to one embodiment.

In particular, a network RMEC comprises two entities MEC and MEC2. For example, entity MEC1 corresponds to a MEC architecture of a first domain, i.e. connected to a first network R, and which is interfaced with an architecture of a second domain, i.e. connected to a second network R2, this second domain being different from and possibly remote from the first domain.

Entity MEC1 comprises elements identical to those described in the previous figure. The corresponding MEC architecture further comprises a service module MECS connected to manager MEPM as well as to a first industrial data space IDS-A. The data plane DP that this MEC architecture comprises is connected to the first network R, which is for example a cloud network of a first factory of the first domain.

The other entity MEC2 comprises elements similar to those of entity MEC1, and in particular, a host module MECH2 comprising a platform module MEP2, at least one application MEA2, and a data plane DP2 connected to the second network R2, for example a cloud network of a second factory which is remote from the first factory.

These entities are connected to each other via points Mp1', Mp2', and Mp3', similar to points Mp1, Mp2, and Mp3 described above.

Entity MEC2 further comprises a manager MEPM2 connected to another service module MECS2, itself connected to manager MEPM2 as well as to a second industrial data space IDS-B.

In the example shown here, data plane DP is used to control a robot via the network R of the first factory, while data plane DP2 is used to control another robot via the network R2 of the second factory.

Generally, robots of the same type or from the same manufacturer are configured so that the same cyber-physical system can be used to control these robots to perform a task. In particular, two robots connected to two separate networks R and R2 can be controlled remotely by different ordering parties, here by the two industrial data spaces IDS-A and IDS-B having the same cyber-physical system.

Controlling a robot via a given network may require resources absent from the MEC architecture connected to this network. For example, an ordering party corresponding to industrial space IDS-A will not be able to control a robot connected to network R2 if such control requires an application present in MEA but absent from MEA2.

For example, the industrial site of the first domain does not necessarily have the applications necessary to control a robot on the industrial site of the second domain, even if the first domain includes a similar or identical robot.

To exchange information, entities MEC1 and MEC2 have inter-domain interfaces. The following describes how to improve their corresponding architectures and the associated methods for enabling the transmission and execution of these applications.

An interface between the two entities MEC1 and MEC2 is for example possible by means of reference point Mp3 enabling platform module MEP to communicate with other platforms, and in particular with platform module MEP2 of host module MECH2 comprised in the second architecture MEC2.

As illustrated, this interface and communication is via reference point Mp3, which connects platform modules MEP and MEP2. Reference point Mp3 is represented as belonging to entity MEC1, but this is equivalent to the corresponding reference point Mp3' in the other entity MEC2.

As described above, the interface implemented by means of the intermediate point Mp3 between entities MEC1 and MEC2 by itself does not enable sharing or transmitting an executable application from one MEC architecture to another.

For example, although reference point Mp3 enabling an interface between two MEC architectures makes it possible to provide a robot control application from one architecture to another, Mp3 by itself does not enable the remote execution of a control command for this robot.

A solution provided by the embodiments herein provides for the creation of a new interface.

Figure 3:
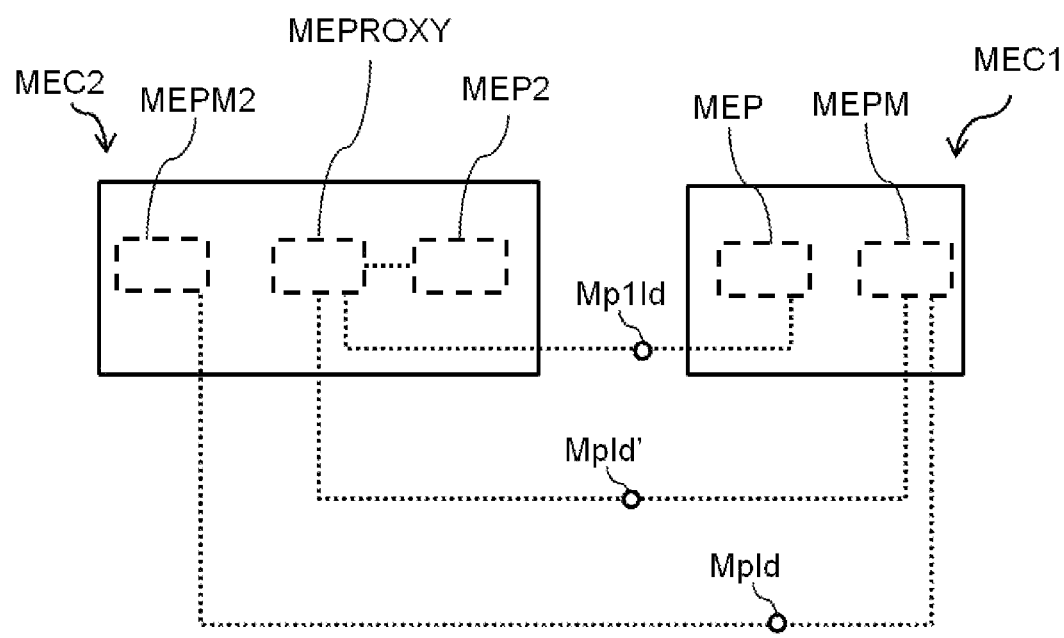
FIG. 3 represents a schematic view of different implementations of connections between several entities.

Reference is now made to FIG. 3, which represents a schematic view of connections between two entities, and more precisely between two entities MEC1 and MEC2.

A module MEPROXY is present in entity MEC2. This module is either located outside platform module MEP2 and connected to it and/or to manager MEPM2, for example by means of a connection in entity MEC2, or is installed directly in platform module MEP2.

According to different variants which can be combined with each other, at least one interface between the two entities MEC1 and MEC2 is implemented by means of reference points referred to as intermediate reference points, in order to allow inter-domain application exchanges.

In a first of these variants, an interface is defined by an intermediate reference point MpId connecting managers MEPM and MEPM2 of the two architectures. The intermediate reference point MpId thus allows direct or indirect communication between the two entities MEC1 and MEC2. Point MpId may for example be located in a host level HL of the first MEC architecture or of the second MEC architecture which correspond to the entities.

In a second of these variants, an interface is defined by another intermediate reference point Mp1Id which connects platform module MEP of entity MEC1 to module MEPROXY of the other entity MEC2.

In a third of these variants, an interface is defined by yet another intermediate reference point MpId' connecting manager MEPM of entity MEC1 to module MEPROXY of the other entity MEC2.

In general, a direct or indirect interface may be implemented between at least three MEC architectures using reference points similar to those described above.

Figure 4:
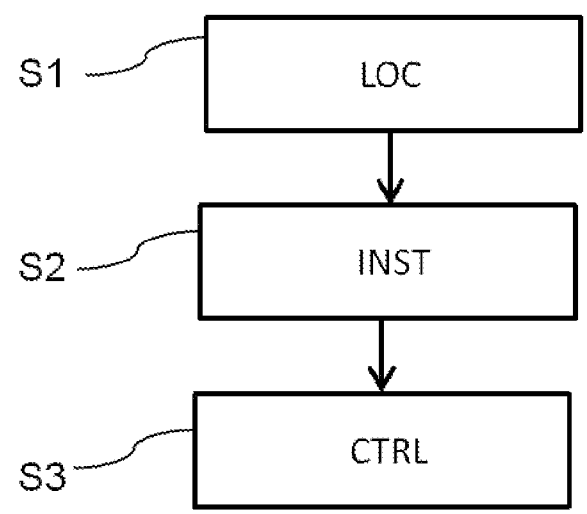
FIG. 4 represents, in the form of a flowchart, steps of a method for controlling an edge computing network according to one embodiment.

Reference is now made to FIG. 4, which represents in flowchart form the steps of a method for controlling a multi-access edge computing network according to one embodiment.

A first step S1 concerns the locating of module MEPROXY within entity MEC2. For example, this locating is implemented at least by the exchange of a location request-response pair between two entities MEC1 and MEC2, the result being a providing of the position of the module within MEC2, for example by specifying its IP address.

A second step S2, which follows step S1, concerns the installation of a proxy function FPROXY in at least one module whose location is known. For example, this installation includes an exchange of an installation request-response pair for function FPROXY. For example, said installation request-response pair is exchanged between module MPEROXY located during step S1 and at least one application MEA2.

A third step S3, which follows step S2, concerns the control of a network operation, in particular the execution of a service application. For example, this control comprises an exchange of a control request-response pair, said control request-response pair being exchanged between the first MEC architecture and module MEPROXY which comprises function FPROXY installed during step S2.

Figure 5:
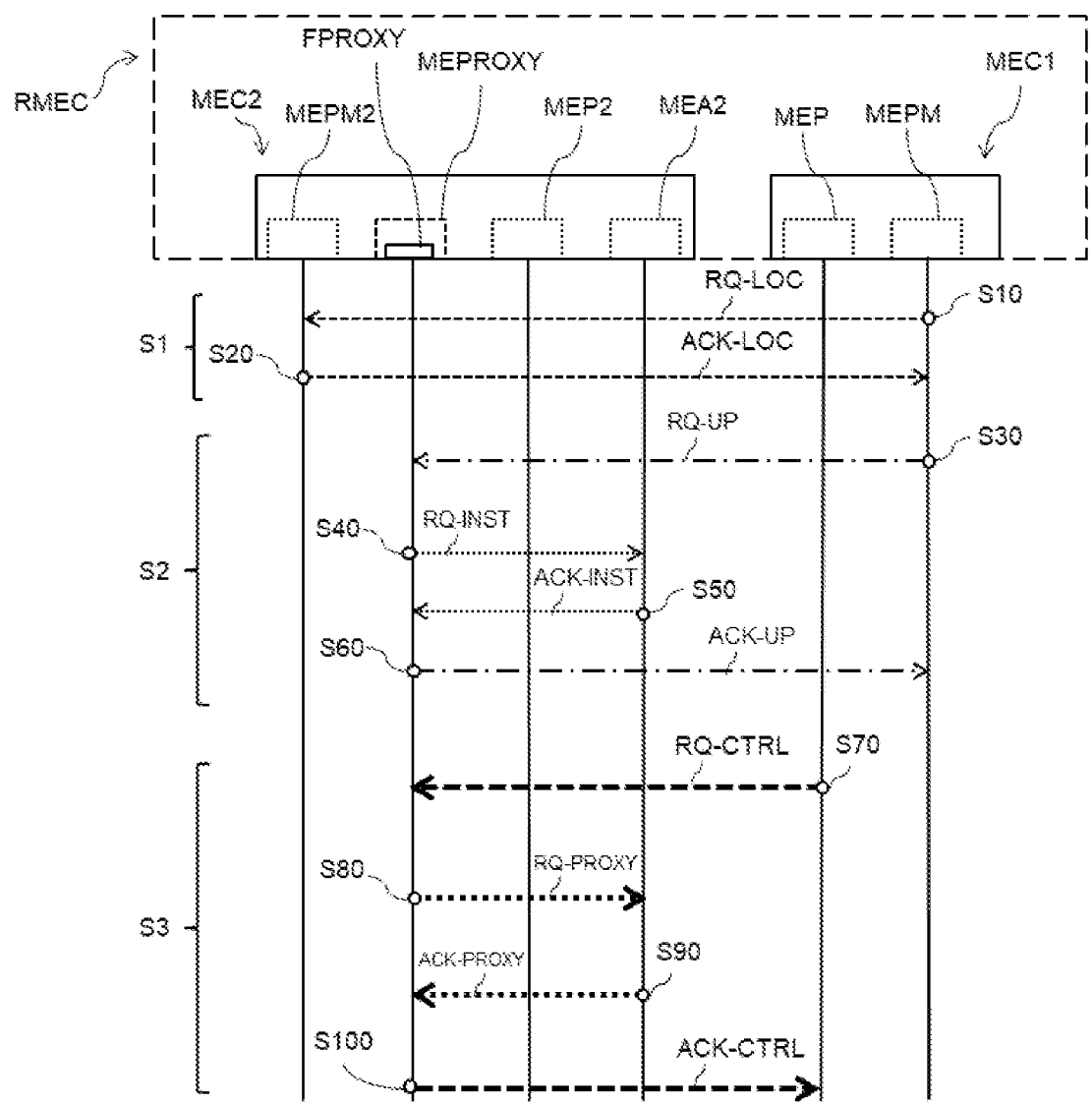
FIG. 5 represents, in the form of a flow diagram, the steps of a method for controlling an edge computing network according to another embodiment.

Reference is now made to FIG. 5, which represents in flow diagram form the steps S10, S20, S30, S40, S50, S60, S70, S80, S90, and S100 of a method for controlling an edge computing network according to another embodiment.

These flows may be data flows and/or control flows, also called command flows. The transmission or exchange of control flows is made possible by the embodiments described herein.

As illustrated, module MEPROXY and proxy function FPROXY are represented as distinct and separate from platform module MEP2. However, this does not exclude module MEPROXY and proxy function FPROXY from being installed in platform module MEP2.

In connection with the steps described above, the location step S1 comprises steps S10 and S20, the installation step S2 comprises steps S30, S40, S50, and S60, and the step S3 of controlling a network operation, in particular an execution of a service application, comprises steps S70, S80, S90, and S100.

As illustrated, during step S10, manager MEPM of entity MEC1 sends a location request RQ-LOC to manager MEPM2 of entity MEC2. This makes it possible to request the address of module MEPROXY. The location request RQ-LOC is preferably sent via intermediate reference point MpId.

During step S20, upon receipt of request RQ-LOC, a location acknowledgment message ACK-LOC is sent back from manager MEPM2 to manager MEPM. This acknowledgment message is used to specify the location of module MEPROXY to entity MEC1. The acknowledgment message ACK-LOC is preferably also sent via intermediate reference point MpId.

The acknowledgment ACK-LOC comprises an IP address of the located module MEPROXY, for example the IP address of the server hosting it. According to another example, and specified by manager MEPM2.

Once the address of module MEPROXY has been specified to manager MEPM of entity MEC1, manager MEPM initiates the installation of one or more applications in entity MEC2, via reference point Mp1, reference point Mp3, or intermediate reference point MpId. This installation is implemented during steps S30 to S60, in order to prepare for the installation of proxy function FPROXY in module MEPROXY.

Step S30 comprises sending an upload request RQ-UP from manager MEPM to MEC2, in particular to module MEPROXY of MEC2.

According to various examples, the upload request RQ-UP may be sent from a central point integrated into the MEC architecture corresponding to MEC1 or from another point such as a server or any other type of device connected to MEC1.

Preferably, step S30 is implemented upon receipt of the location acknowledgment message ACK-LOC, upon receipt of location information from module MEPROXY or of an instruction to install an application or a function in module MEPROXY if its location is given in the installation instruction.

In practice, and as an example, the installation of proxy function FPROXY is implemented by an ordering party associated with entity MEC1, for example by an ordering party having access to industrial data space IDS-A. An installation or an update of this function may be implemented by means of a MEO orchestrator or an OSS system of either of entities MEC1 and MEC2.

During step S40, module MEPROXY sends an installation request RQ-INST to at least one application MEA2 comprised in entity MEC2. This request is preferably sent via point Mp1'.

According to different examples, module MEPROXY and/or function FPROXY are instantiated. For example, the OSS system or systems comprised in entities MEC1 and MEC2 are connected to platform MEPM, and furthermore are configured to trigger the instantiation or closing of function FPROXY.

Upon receipt of the installation request RQ-INST, proxy function FPROXY is installed in the second entity MEC2 during step S40. This installation is implemented by at least one edge application MEA2. Preferably, function FPROXY is installed directly in module MEPROXY.

Still upon receipt of the installation request RQ-INST, and following the installation of function FPROXY, an installation acknowledgment message ACK-INST is sent during step S50 by the second entity MEC2 to the first entity MEC1. In particular, the installation acknowledgment message ACK-INST is sent by module MEPROXY to manager MEPM of the MEC architecture.

Preferably, the installation acknowledgment message ACK-INST is sent via reference point Mp1'.

Upon receipt of the installation acknowledgment message ACK-INST, and during step S50, an upload acknowledgment message ACK-UP is sent by module MEPROXY to manager MEPM.

Preferably, the installation acknowledgment message ACK-INST is sent via intermediate reference point MpId'.

According to another example, not shown, the upload acknowledgment message ACK-UP may be sent during step S50 and more generally upon receipt of the upload request RQ-UP, when this allows proceeding directly to the installation of function FPROXY in module MEPROXY.

The installation acknowledgment message ACK-INST indicates to manager MEPM, and therefore to entity MEC1, that the installation of proxy function FPROXY is complete.

After the installation of proxy function FPROXY is complete, platform module MEP initiates control of an execution of a service application by means of the installed proxy.

In particular, this control comprises several steps S70 to S100 which allow guaranteeing that the control is initiated by an ordering party external to entity MEC2, for example an ordering party having access to industrial data space IDS-A rather than industrial data space IDS-B.

To do this, a step S70 is implemented and comprises the transmission of a control request RQ-CTRL from platform module MEP to entity MEC2, and in particular to module MEPROXY comprised in MEC2.

For example, this request may correspond to a request from an ordering party associated with industrial data space IDS-A connected to entity MEC1, in order to be able to execute an application in entity MEC2.

Thus, if manager MEPM2 is initially configured to run an application only on the basis of commands coming from an ordering party associated with industrial data space IDS-B, the installation of function FPROXY in module MEPROXY allows this execution to be delegated to the ordering party associated with industrial data space IDS-A.

Preferably, step S70 is implemented upon receipt of the location acknowledgment message ACK-UP, or more generally upon receipt of a confirmation that function FPROXY has indeed been uploaded and/or installed in module MEPROXY.

Upon receipt of the control request RQ-CTRL, an application present in MEA2 is cached. Here, "cached" is understood to mean that the execution of this application, initially permitted for a first client, for example a client associated with industrial data space IDS-A, is delegated to a second ordering party, for example another ordering party who is associated with industrial data space IDS-B rather than with IDS-A.

In particular, step S80 implements this caching upon receipt, by MEA2, of a caching request RQ-PROXY, this caching request being transmitted by module MEPROXY, preferably via point Mp1'.

When delegation of the application is applied such that its execution by the second ordering party instead of only by the first ordering party is now permitted, a caching acknowledgment message ACK-PROXY is transmitted by MEA2 to module MEPROXY, in order to confirm that delegation of the execution of the application concerned is indeed effective.

Upon receipt of the caching acknowledgment message ACK-PROXY, and following the delegation of the execution of the application, a control acknowledgment message ACK-CTRL is sent during step S100 by entity MEC2 to entity MEC1. In particular, the control acknowledgment message ACK-CTRL is sent by module MEPROXY from entity MEC2 entity to platform module MEP of entity MEC1.

This control acknowledgment message ACK-CTRL is used to indicate to entity MEC1 that an execution of a service application can be controlled by means of the installed proxy function.

During step S100 or during one or more steps subsequent to step S100, control of the execution of one or more service applications by means of the proxy function installed in MEPROXY. Such control comprises, for example, the execution of an application enabling the controlling of a connected device, the controlling of a robot, the coordination of movement between multiple machine tools, or even the transmission of information or signals to an operator.

As an illustration, industrial data space IDS-A is initially a client of the services provided by a MEC architecture belonging to a first domain, this client wanting to be allowed to use a robot connected in a second domain associated with another MEC architecture.

In practice, at a first time t1, the robot performs tasks for a client industrial data space IDS-B of the services provided by entity MEC2. At a second time t2, the implementation of steps S1 to S3 makes it possible to make available, via the first domain, from industrial data space IDS-A, one or more resources that can be used by it. The first domain thus takes on the responsibility for performing a task that it could not perform initially.

Entity MEC1 is thus able to find resources or services on behalf of IDS-A in another domain.

In addition, each of the domains can also show or share its resources independently, so as to make them available to multiple other domains.

Figure 6:
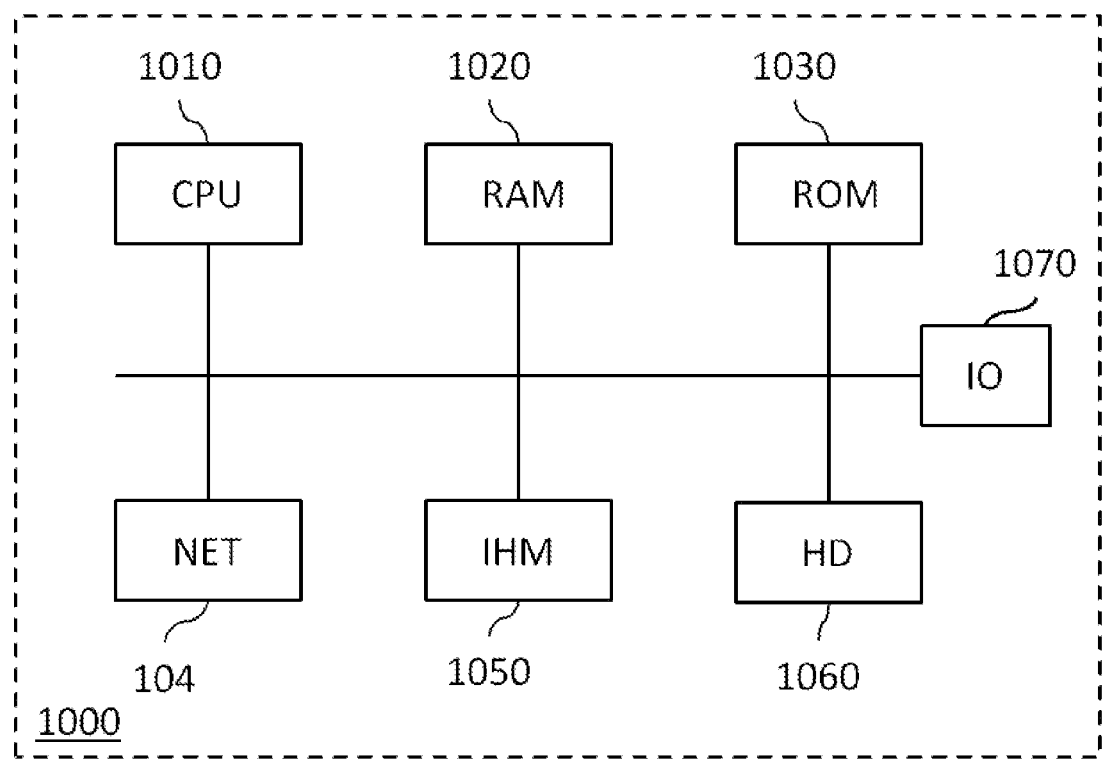
FIG. 6 represents a schematic block diagram of a computer processing circuit according to one embodiment.

FIG. 6 represents a schematic block diagram of a computer processing circuit according to one exemplary implementation of the embodiments described.

According to one example, said computer processing circuit is a processor. Preferably, such a computer processing circuit is a system on chip 1000 arranged to implement a method for controlling an edge computing network. In particular, this computer processing circuit may correspond to a piece of hardware defining module MEPROXY, a platform module MEP, or a manager MEPM.

In a non-limiting manner, the system on chip 1000 comprises a communication bus connected, for example, to a central processing unit 1010, such as a processor or a microprocessor, and denoted CPU.

The system on chip 1000 further comprises a random access memory 1020, denoted RAM, able to store the executable code of the control method as well as registers suitable for saving variables and parameters necessary for implementing the method according to some embodiments, the memory capacity thereof possibly being supplemented by an optional RAM memory connected to an expansion port, for example.

In addition, the system on chip 1000 comprises a read-only memory 1030, denoted ROM, for storing computer programs for implementing the embodiments described above, as well as a network interface 1040 which is normally connected to a communication network over which are sent or received the digital data to be processed.

The network interface 1040 may be a single network interface or may be composed of a set of different network interfaces (e.g. wired and wireless, interfaces or different types of wired or wireless interfaces).

Data packets are sent over the network interface for transmission or are read from the network interface for reception, and under the control of the software application executed in the processor or microprocessor 1010.

Furthermore, the system on chip 1000 comprises a user interface 1050 for receiving inputs from a user or for displaying information to a user, an optional storage medium 1060 denoted HD, and an input-output module 1070 denoted IO, for receiving/sending data from or to external devices such as a hard disk, a removable storage medium, or others.

In an example presented here, the executable code may be stored in read-only memory 1030, on the storage medium 1060, or on a digital removable medium such as a disc for example.

According to a variant, the executable code of the programs may be received by means of a communication network, via the network interface 1040, in order to be stored in the storage medium 1060, before being executed.

The central processing unit 1010 is suitable for controlling and directing the execution of instructions or software code portions of the program or programs according to one of the embodiments, these instructions being stored in one of the aforementioned storage means. After powering on, the CPU 1010 is able to execute instructions stored in the main RAM memory 1020, relating to a software application, after these instructions have been loaded from ROM for example.

In the example shown here, the system on chip 1000 is a programmable device that uses software. However, alternatively, this description may be implemented in any type of hardware (for example, in the form of a dedicated integrated circuit or ASIC).

The invention claimed is:

1. A method for controlling a service application in a multi-access edge computing network, the network comprising a plurality of interconnected entities, the method comprising:
controlling, by a platform module comprised in a first entity of the plurality, an execution of a service application installed in a second entity of the plurality, by means of a proxy function comprised in the second entity, the second entity being distinct from the first entity, the first entity and the second entity being MEC architectures, and the proxy function enabling resource and service application exchanges between different MEC architectures.

2. The method according to claim 1, further comprising:
locating a module among a plurality of modules comprised in the second entity; and
installing the proxy function in the located module.

3. The method according to claim 2, further comprising:
analyzing a network topology in order to identify the presence of a current module in a multi-access edge platform of the network, with a view to locating the module; and
selecting the current module as the located module, with a view to installing the proxy function.

4. The method according to claim 2, wherein the installed proxy function is configured to delegate control over the execution of the service application to the second entity.

5. The method according to claim 2, wherein the locating of the module is implemented upon receipt, by the first entity, of a location response to a corresponding location request.

6. The method according to claim 5, wherein at least one request or at least one response to a request is sent via an intermediate reference point connecting the first entity and the second entity.

7. The method according to claim 2, wherein the installation of the proxy function is implemented upon receipt, by the located module, of a request to upload the proxy function.

8. The method according to claim 2, wherein the proxy function is installed via a multi-access edge application of the second entity upon receipt, by the application, of an installation request.

9. The method according to claim 2, wherein the control of the execution of the service application is implemented upon receipt, by the second entity, of a control request.

10. The method according to claim 9, wherein the control of the execution of the service application further comprises a sending, by the located module and to the first entity, of a control response to the control request.

11. The method according to claim 2, wherein the delegation of the control of the execution of the service application is implemented upon receipt, by the first entity, of a representation request from the second entity.

12. A processing circuit comprising a processor and a memory, the memory storing program code instructions of a computer program for implementing the method according to claim 1, when the instructions are executed by the processor of the processing circuit.

13. A non-transitory storage medium, removable or not, partially or entirely readable by a computer or a processor, comprising code instructions of a computer program for the execution of the method according to claim 1.

* * * * *